United States Patent Office 3,422,116
Patented Jan. 14, 1969

1

3,422,116
PHTHALIMIDOMETHYL PROPIOLACTONES
August Henry Frazer, Wilmington, Del., assignor to E. I. du Pont de Nemours and Company, Wilmington, Del., a corporation of Delaware
No Drawing. Filed June 2, 1965, Ser. No. 460,864
U.S. Cl. 260—326                     3 Claims
Int. Cl. C07d 99/04; C08g 17/02

ABSTRACT OF THE DISCLOSURE 2-(N-phthalimidomethyl)-2-methyl-3-propiolactone and 2,2-bis (N-phthalimidomethyl)-3-propiolactone are disclosed which are used in the preparation of fiber-forming copolyesters of 2,2-disubstituted propiolactones. Fibers thereof exhibit, after treatment with alcoholic hydrazine solution, excellent affinity for acid dyes.

This invention relates to novel lactones, and to novel copolyesters thereof with 2,2-dialkyl-3-propiolactones.

Fibers of polypivalolactone and other polymeric 2,2-dialkyl-3-propiolactones are valuable for the production of various textile materials, including garments requiring only minimum care. However, the fibers have a relatively low affinity for most dyes, a circumstance which severely restricts the suitability of the fibers for use in the production of colored fabrics.

In accordance with this invention, it has been found that 2-(N-phthalimidomethyl)-2-methyl-3-propiolactone (I) and 2,2-bis(N-phthalimidomethyl)-3-propiolactone (II) can be readily prepared and have excellent utility in the preparation of copolyesters of 2,2-disubstituted propiolactones exhibiting, after treatment with alcoholic hydrazine solution, excellent affinity for the commercially important class of acid dyes.

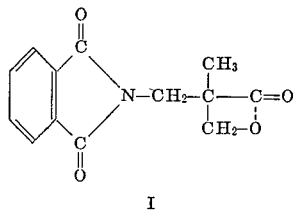

I and

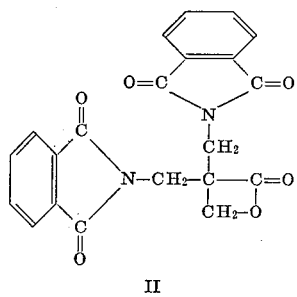

II

2

According to the invention, a useful method for preparing the novel lactones comprises reacting potassium phthalimide (III) with 2-chloromethyl-2-methyl-3-propiolactone (IV) or, respectively, with 2,2-bis(chloromethyl)-3-propiolactone (V):

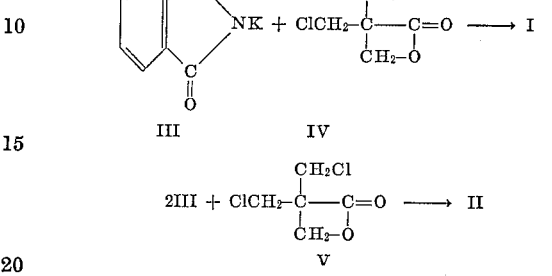

Dimethyl sulfoxide is an advantageous solvent in which the reaction may be carried out. The novel lactones may also be prepared by substituting the phthalimide salts of other metals, especially other alkali metals, for potassium phthalimide in the above reactions; or by replacing either of the respective chloro-substituted lactones with a lactone correspondingly substituted with another halogen.

The following examples illustrate the preparation of the novel lactones. The preparation of 3,3'-dichloropivalic acid, referred to in Example 1, is described by Wilzbach, Mayo, and Van Meter in J. Am. Chem. Soc., vol. 70, page 4069 (1948).

EXAMPLE 1

2-(N-phthalimidomethyl)-2-methyl-3-propiolactone

A 2-liter flask provided with a stopcock at the bottom is equipped with a stirrer, condenser, and thermometer. In the flask is placed a solution of 38.0 g. of sodium hydroxide in 500 ml. of water, followed by 100 ml. of a saturated sodium chloride solution. A solution of 171 g. of 3,3'-dichloropivalic acid in 600 ml. of ethylene is then added. The mixture is stirred vigorously and is heated at 50° C. for 30 minutes, after which the layers are allowed to separate. The ethylene chloride lower layer is drained off. A second quantity of 600 ml. of ethylene chloride is added and the mixture is stirred and heated at 50° C. for 30 minutes, followed by separation of the ethylene chloride lower layer; and the procedure is then repeated once more with an additional 600 ml. quantity of ethylene chloride. The ethylene chloride solutions are combined, dried, and flash distilled to remove the ethylene chloride. The residual liquid is distilled. The product is 2-chloromethyl-2-methyl-3-propiolactone having a boiling point of 53–56° C. at 2.3 mm. of mercury and a refractive index at 24° C. of 1.4520–1.4535. The yield is 84 g. (62% of theory).

To 9.25 g. (0.05 mol) of potassium phthalimide dissolved in 100 ml. of dry dimethyl sulfoxide is slowly added 7.3 g (0.055 mol) of 2-chloromethyl-2-methyl-3-propiolactone. The reaction mixture is stirred overnight at room temperature, chilled to 0–5° C., and filtered. The filtrate is distilled at 52° C. under a pressure of 0.5 mm. of mercury until all of the dimethyl sulfoxide is removed. The residue is crystallized from a mixture of equal parts of water and ethanol, yielding 3.7 g. of the product, 2-(N-phthalimidomethyl)-2-methyl - 3 - propiolactone. After two recrystallizations from a mixture of equal parts of water and ethanol, the product has a melting point of 86–88° C.

Analytical data—Calculated for $C_{13}H_{10}O_4N$: C, 64.0; H, 3.31; O, 26.4; N, 5.50. Found: C, 63.92, 63.95; H, 3.21, 3.23; O, 26.4, 26.45; N, 5.40, 5.42.

The preparation of 2,2-bis(chloromethyl)-3-propiolactone, referred to in the following example, is described by Reynolds and Vickers in their United States Patent 2,977,373, issued Mar. 28, 1961.

EXAMPLE 2

2,2-bis(N-phthalimidomethyl)-3-propiolactone

To 8.0 g. (0.044 mol) of potassium phthalimide dissolved in 100 ml. of dry dimethyl sulfoxide is slowly added 3.74 g. (0.022 mol) of 2,2-bis(chloromethyl)-3-propiolactone. The reaction mixture is stirred overnight at room temperature, chilled to 0–5° C., and filtered. The filtrate is distilled at 52° C. under a pressure of 0.5 mm. of mercury until all of the dimethyl sulfoxide is removed. The residue from the distillation is crystallized from equal parts of water and ethanol, yielding 1.74 g. of the product, 2,2-bis(N-phthalimidomethyl)-3-propiolactone. After two recrystallizations from a mixture of equal parts of water and ethanol, the melting point of the product is 110–114° C.

Analytical data—Calculated for $C_{21}H_{16}O_6N_2$: C, 65.1; H, 3.31; O, 24.51; N, 7.18. Found: C, 65.05, 65.08; H, 3.28, 3.29; O, 24.59, 24.60; N, 7.10, 7.08.

The novel phthalimido-substituted lactones, I and II, are readily copolymerized with 2,2 - dialkyl-3-propiolactones of the formula

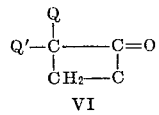

VI wherein Q and Q' are the same or different alkyl radicals containing from 1 to 4 carbon atoms which may optionally be joined by a carbon-to-carbon bond to form an alicyclic ring. Typical 2,2-dialkyl-3-propiolactones with which the phthalimido-substituted lactones of the invention may be copolymerized include pivalolactone (Q=Q'=CH₃)

2,2-diethyl-3-propiolactone (Q=Q'=CH₂CH₃), 2-methyl-2-ethyl-3-propriolactone (Q=CH₃, Q'=CH₂CH₃), 2,2-dipropyl-3-propiolactone (Q=Q'=CH₂CH₂CH₃), 2,2-dibutyl-3-propiolactone (Q=Q'=CH₂CH₂CH₂CH₃), and 2,2-pentamethylene-3-propiolactone (Q+Q'=CH₂CH₂CH₂CH₂CH₂)

The novel copolyesters so formed, when melt-spun and drawn by conventional techniques, yield fibers having physical properties generally comparable to those of the corresponding unmodified homopolyesters. However, after the copolyester fibers have been boiled in a 20% solution of hydrazine in ethanol, they display excellent affinity for acid dyes. The same dyes employed with fibers of the corresponding homopolyesters, even when adsorbed, are not washfast.

More particularly described, the novel copolyesters of the invention are characterized as linear polymers consisting of a succession of recurring ester structural units, from about 90 to about 99.5% of said ester structural units being radicals of the formula

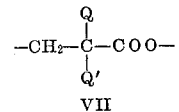

VII wherein Q and Q' are as defined above and the remaining 10 to 0.5% of said ester structural units consisting essentially of radicals selected from the class consisting of

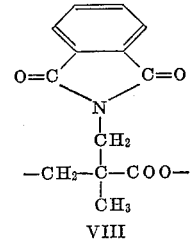

VIII and

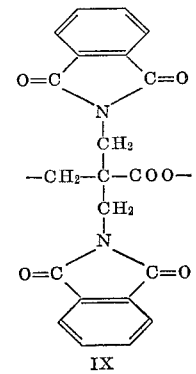

IX

The homopolymer prepared by the polymerization of 2,2-dialkyl-3-propiolactone is designated as poly(oxycarbonyl-1,1-dialkyldimethylene). It may also be named simply as poly(2,2-dialkyl-3-propiolactone). Other alternative names include multi(oxycarbonyl-1,1-dialkyldimethylene) and poly(2,2-dialkylhydracrylic acid). The polymer in which Q=Q'=CH₃ is designated as poly(oxycarbonyl-1,1-dimethyldimethylene), and it is also known by alternative names such as poly(pivalolactone) and poly(hydroxypivalic acid). This polyester is readily prepared by the polymerization of pivalolactone, the intramolecular ester of hydroxypivalic acid, as disclosed by Reynolds and Vickers in their British Patent No. 766,347; or by the polymerization of hydroxypivalic acid as disclosed by Alderson in his U.S. Patent No. 2,658,055. The preparation of poly(oxycarbonyl-1-methyl-1-ethyldimethylene), poly(oxycarbonyl-1-diethyldimethylene), and other polyesters of this kind are described by Etienne and Fisher in their French Patent No. 1,231,163.

The novel copolyesters of the invention are advantageously prepared by polymerization of the lactones in the same manner as the corresponding homopolyesters, incorporating the appropriate amount of one of the phthalimido-substituted lactones of Formulas I and II. Copolymeric compositions are designated herein by listing each of the respective ester structural repeating units, followed by a list of the mol percentage values for each of the units. For instance, a copolyester comprised of 95% of the recurring structural units derived from pivalolactone and 5% of the recurring structural units derived from 2,2-bis-phthalimidomethyl)-3-propiolactone is designated as poly-(oxycarbonyl - 1,1-dimethyldimethylene/oxycarbonyl-1,1 bis[phthalimidomethyl]dimethylene) (95/5).

In the examples below, the term "inherent viscosity" is defined as the polymer property determined in accordance with the following relationship:

$$\eta_{inh} = \frac{\ln \eta_{rel}}{c}$$

wherein the relative viscosity, $\eta_{rel}$, is calculated by dividing the flow time in a capillary viscometer of a dilute solution of the polymer by the flow time for the pure solvent, trifluoroacetic acid. The concentration ($c$) used in the examples is 0.5 gram of polymer per 100 ml. of solution and the temperature used is 30° C. An inherent viscosity of at least about 0.5 is desired for the polymers employed in this invention to be used in films.

As used herein, the "polymer-melt temperature," abbreviated "PMT," is defined as that temperature where a polymer sample becomes molten and leaves a trail when moved across a hot metal surface with moderate pressure. Practical considerations in PMT determinations are discussed by Sorenson and Campbell in "Preparative Methods of Polymer Chemistry," Interscience Publishers, Inc., New York, pages 49–50 (1961).

The novel copolyesters prepared as described above are quite stable in molten form. They are readily processed by conventional melt spinning and drawing techniques to form fibers having physical properties generally comparable to those of the corresponding unmodified homopolyesters. However, the fibers of the novel copolyesters are adapted for greatly enhanced dyeability with respect to the corresponding homopolyesters. Prior to dyeing, the fibers are subjected to a pretreatment with an ethanolic solution of hydrazine to remove the substituents on the amine groups in the copolyester. In this step the material comprising the fibers is converted to a linear copolyester consisting of a succession of recurring ester structural units, from about 90 to about 99.5% of said units being the radicals of Formula VII and the remaining 10 to 0.5% of said units being at least one of the radicals of the formulas

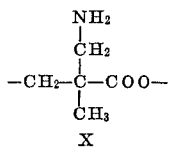

X and

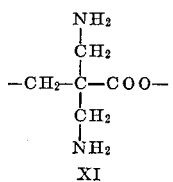

XI

Fibers of these copolyesters containing primary amine groups display excellent affinity for acid dyes.

EXAMPLE 3

Copolyesters of pivalolactone and 2-(N-phthalimidomethyl-2-methyl-3-propiolactone To a 50-ml. round-bottom flask equipped with a magnetic stirrer is charged 13.5 g. (0.135 mol) of pivalolactone, 1.83 g. (0.0075 mol) of 2-(N-phthalimidomethyl) 2-methyl-3-propiolactone, and 0.07 g. of triphenylphosphine. The reaction mixture is warmed and polymerization commences. Heating is continued to maintain the reaction mixture at 50° C. After three hours the mixture is cooled, transferred into methanol, and the solid is filtered off and washed with methanol. It contains 0.27% nitrogen by analysis, corresponding to incorporation of 2 mol percent of the 2-(N-phthalimidomethyl)-2-methyl-3-propiolactone. The yield of copolymer, poly(oxycarbonyl - 1,1 - dimethyldimethylene/oxycarbonyl - 1 - N-phthalimido-methyl-1-methyldimethylene) (98/2), is 12.1 g. It has an inherent viscosity of 1.3 and a PMT of 250° C.

The copolymer is press-spun at 248–253° C. through an orifice 0.305 mm. (12 mils) in diameter, the resulting extruded filament being passed into ice water and wound at 215 meters/min. (235 y.p.m.). The filament is drawn 1.8× over a curved hot plate at 125° C., heated taut at 175° C. for one hour, and boiled off by immersion in boiling water for 30 minutes. The filament has a tenacity of 4.0 g.p.d., an elongation of 80%, an initial modulus of 31 g.p.d., a work recovery at 5% elongation of 83%, and a tensile recovery at 5% elongation of 93%.

The fiber prepared as described above is boiled for three hours in a 20% solution of hydrazine in ethanol. The hydrazine-treated fiber is dyed to a deep shade of blue with an acid dye identified by Colour Index No. 62,055. The dyeing step is carried out at 100° C. for two hours, employing 3 g. of the fiber and 150 ml. of a dyebath comprising 0.015 g. of dye, 0.12 g. concentrated sulfuric acid, and 0.15 g. of sodium sulfate. A control fiber of unmodified poly(oxycarbonyl-1,1-dimethyldimethylene), prepared in general accordance with the procedure described above but omitting the 2-(N-phthalimidomethyl)-2-methyl-3-propiolactone, is only tinted when dyed under the same conditions.

Films melt-pressed from a similarly prepared copolymer having the same nitrogen analysis and an inherent viscosity of 1.4 are dyed a deep shade of blue when dyed as described above, after the film is boiled for two hours in a 20% solution of hydrazine in ethanol.

The general procedure described above is repeated, employing 14.55 g. (0.146 mol) of pivalolactone and 1.2 g. (0.0049 mol) of 2-(N-phthalimidomethyl)-2-methyl-3-propiolactone. The product contains 0.17% nitrogen by analysis, corresponding to incorporation of 1.2 mol percent of the 2-(N-phthalimidomethyl)-2-methyl-3-propiolactone. The yield of copolymer, poly(oxycarbonyl-1,1 - dimethyldimethylene/oxycarbonyl - 1-N-phthalimidomethyl-1-methyldimethylene) (98.8/1.2), is 13.5 g. It has an inherent viscosity of 1.5 and a PMT of 255° C. A filament is spun as described above, the rate of windup being 228 meters/min. (250 y.p.m.). The filament is drawn 1.5× at 130° C., after which it is heated one hour at 175° C. and boiled off for 30 minutes. The filament so prepared has a tenacity of 4.1 g.p.d., an elongation of 79%, an initial modulus of 32 g.p.d., a work recovery at 5% elongation of 85%, and a tensile recovery at 5% elongation of 95%. When treated with an ethanolic solution of hydrazine and dyed as described above, it is dyed to a deep shade of blue.

EXAMPLE 4

Copolyester of pivalolactone and 2,2-bis(N-phthalimidomethyl)-3-propiolactone

To a 50-ml. round-bottom flask equipped with a magnetic stirrer is charged 4.5 g. (0.045 mol) of pivalolactone, 0.98 g. (0.0025 mol) of 2,2-bis(N-phthalimidomethyl)-3-propiolactone, and 0.05 g. of triphenylphosphine. The reaction mixture is warmed and polymerization commences. Heating is continued to maintain the reaction mixture at 50° C. After three hours, the mixture is cooled, transferred into methanol, and the solid is filtered off and washed with methanol. It contains 0.71% nitrogen by analysis, corresponding to incorporation of about 3 mol percent of the 2,2-bis(N-phthalimidomethyl) 3-propiolactone. The yield of copolymer, poly(oxycarbonyl-1,1-dimethyldimethylene/oxycarbonyl-1,1 - bis[N-phthalimidomethyl]-dimethylene) (97/3), is 5.5 g. It has an inherent viscosity of 0.52 and a PMT of 250° C. Films melt-pressed from the copolymer, when boiled for one hour in a 10% solution of hydrazine in ethanol, are dyed to a deep shade of blue with an acid dye identified by Colour Index No. 62,055 and to a medium shade of green with an acid dye identified by Colour Index No. 61,570.

Fibers of the novel copolyesters also exhibit excellent dyeability with disperse dyes such as 1-amino-4-hydroxy-2-(2-methoxyethoxy)anthraquinone, 4-(2,6 - dichloro - 4-nitrophenylazo)-2-chloro-N-(2-cyanoethyl)aniline, and a mixture of monochlorinated 1,5-diamino-4,8-dihydroxyanthraquinone and 1,8 - diamino - 4,5 - dihydroxyanthraquinone.

What is claimed is:
1. A lactone selected from the group consisting of

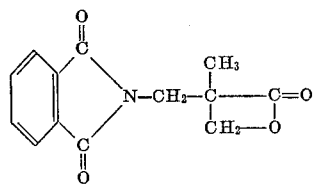

and

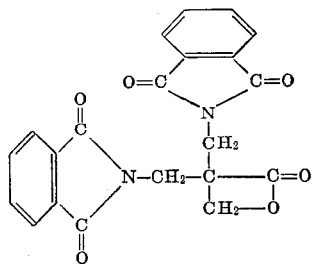

2. 2-(N-phthalimidomethyl)-2-methyl-3-propiolactone.
3. 2,2-bis(N-phthalimidomethyl)-3-propiolactone.

References Cited

Baker, Chemical Abstracts, 46:10164c (1952) abstract of J. Org. Chem. 17:68–76 (1952).

Dey, Chemical Abstracts, 31:7058[8] (1937) abstract of J. Chem. Soc. 1937:1166–8.

NICHOLAS S. RIZZO, Primary Examiner

J. A. NARCAVAGE, Assistant Examiner.

U.S. Cl. X.R.

260—78, 78.3; 8—39, 55.